United States Patent
Hall et al.

(10) Patent No.: US 11,086,191 B2
(45) Date of Patent: Aug. 10, 2021

(54) QUANTUM OPTICAL WAVELENGTH CONVERTER

(71) Applicant: Notchway Solutions, LLC, Franconia, NH (US)

(72) Inventors: Katherine L. Hall, Arlington, MA (US); Kristin A. Rauschenbach, Franconia, NH (US)

(73) Assignee: Notchway Solutions, LLC, Franconia, NH (US)

( * ) Notice: Subject to any disclaimer, the term of this patent is extended or adjusted under 35 U.S.C. 154(b) by 0 days.

(21) Appl. No.: 16/466,283

(22) PCT Filed: Dec. 6, 2017

(86) PCT No.: PCT/US2017/064842
§ 371 (c)(1),
(2) Date: Jun. 3, 2019

(87) PCT Pub. No.: WO2018/106765
PCT Pub. Date: Jun. 14, 2018

(65) Prior Publication Data
US 2020/0183250 A1  Jun. 11, 2020

Related U.S. Application Data

(60) Provisional application No. 62/430,873, filed on Dec. 6, 2016.

(51) Int. Cl.
*G02F 1/35* (2006.01)
*G02F 1/365* (2006.01)
*G06N 10/00* (2019.01)

(52) U.S. Cl.
CPC .............. *G02F 1/3534* (2013.01); *G02F 1/35* (2013.01); *G02F 1/365* (2013.01); *G06N 10/00* (2019.01)

(58) Field of Classification Search
CPC ........ G02F 1/3534; G02F 1/365; G06N 10/00
See application file for complete search history.

(56) References Cited

U.S. PATENT DOCUMENTS

| 3,585,393 A * | 6/1971 | Duguay | G02F 1/35 |
| | | | 708/191 |
| 6,876,487 B1 * | 4/2005 | Marshall | G02F 1/3534 |
| | | | 359/326 |

(Continued)

FOREIGN PATENT DOCUMENTS

| JP | 2007-271725 A | 10/2007 | |
| JP | 2012004956 A * | 1/2012 | ............... H04L 9/12 |

OTHER PUBLICATIONS

"Notification of Transmittal of the International Search Report and the Written Opinion of the International Searching Authority, or the Declaration" for International Patent Application No. PCT/US2017/064842, dated Mar. 21, 2018, 20 pages, Korean Intellectual Property, Daejeon, Republic of Korea.

(Continued)

*Primary Examiner* — Daniel Petkovsek
(74) *Attorney, Agent, or Firm* — Rauschenbach Patent Law Group, LLC; Kurt Rauschenbach

(57) ABSTRACT

An optical quantum state converter comprises an optical fiber input port configured to receive an optical signal comprising an optical quantum state at a first wavelength from an optical source. An optical combiner having a first input is coupled to the optical fiber input port. An optical pump source having an output that is coupled to a second input of the optical combiner provides an optical pump signal at a pump signal wavelength to a second input of the combiner. A nonlinear optical waveguide having an input that is coupled to an output of the optical combiner converts the optical quantum state at the first wavelength to an optical (Continued)

quantum state at a second wavelength determined by the optical pump signal.

11 Claims, 6 Drawing Sheets

(56) References Cited

U.S. PATENT DOCUMENTS

| | | | | |
|---|---|---|---|---|
| 7,242,700 B2* | 7/2007 | Wang | ................... | H01S 3/0014 |
| | | | | 372/21 |
| 7,826,502 B2* | 11/2010 | Lu | ............................. | G02F 1/37 |
| | | | | 372/22 |
| 8,199,396 B2* | 6/2012 | Kusukame | ........... | H04N 9/3129 |
| | | | | 359/328 |
| 2005/0254823 A1 | 11/2005 | Beausoleil et al. | | |
| 2013/0223459 A1 | 8/2013 | Radic | | |
| 2014/0099104 A1 | 4/2014 | Peters et al. | | |
| 2014/0104678 A1 | 4/2014 | Rafailov et al. | | |
| 2015/0055961 A1* | 2/2015 | Meyers | ................. | H04B 10/70 |
| | | | | 398/140 |
| 2016/0291442 A1 | 10/2016 | Ai et al. | | |

OTHER PUBLICATIONS

"Notification Concerning Transmittal of International Preliminary Report on Patentability (Chapter I of the Patent Cooperation Treaty)" for International Patent Application No. PCT/US2017/064842, dated Jun. 20, 2019, 17 pages, The International Bureau of WIPO, Geneva, Switzerland.

* cited by examiner

| SPECIFICATION @ 25°C | DOWN CONVERTER | | | UP CONVERTER | | |
|---|---|---|---|---|---|---|
| INPUT CENTER WAVELENGTH | 760nm TO 800nm IN 5nm INCREMENTS | | | 1445nm TO 1605nm IN 20nm INCREMENTS | | |
| | 760nm | 765nm-795nm | 800nm | 1445nm | 1465nm 1585nm | 1605nm |
| INPUT WAVELENGTH TUNING RANGE | +10nm | ±5nm | -10nm | +40nm | ±20nm | -40nm |
| OUTPUT WAVELENGTH RANGE | 1445nm to 1605nm | | | 760nm to 800nm | | |
| OUTPUT PUMP POWER LEVEL (RESIDUAL) | LOW RESIDUAL | VERY LOW RESIDUAL | ULTRA LOW RESIDUAL | LOW RESIDUAL | VERY LOW RESIDUAL | ULTRA LOW RESIDUAL |
| | -20DBM | -50DBM | -80DBM | -20DBM | -50DBM | -80DBM |
| CONVERSION EFFICIENCY | 31% | 25% | 20% | 31% | 25% | 20% |
| OPTICAL PORT FIBER TYPE | POLARIZATION MAINTAINING FIBER | | | POLARIZATION MAINTAINING FIBER | | |
| OPTICAL PORT TERMINATIONS | FC/APC, SC/APC | | | FC/APC, SC/APC | | |
| OPERATING CASE TEMPERATURE | +15°C TO +30°C | | | +15°C TO +30°C | | |
| DIMENSIONS | 40cm X 30cm x15cm | | | 40cm X 30cm x15cm | | |
| WEIGHT | <5kg | | | <5kg | | |

FIG. 3

QUANTUM OPTICAL WAVELENGTH CONVERTER

CROSS-REFERENCE TO RELATED APPLICATION

The present application is a 35 U.S.C. § 371 application based on International Patent Application No. PCT/US2017/064842, filed on Dec. 6, 2017, entitled "Quantum Optical Wavelength Converter ", which claims priority to U.S. Provisional Patent Application Ser. No. 62/430,873, filed Dec. 6, 2016, entitled "Quantum Optical Wavelength Converter". The entire contents of International Patent Application No. PCT/US2017/064842 and U.S. Provisional Patent Application Ser. No. 62/430,873 are incorporated herein by reference.

CROSS REFERENCE TO RELATED APPLICATION

The present application is non-provisional application of U.S. Provisional Patent Application Ser. No. 62/430,873, entitled "Quantum Optical Wavelength Converter" filed on Dec. 6, 2016. The entire contents of U.S. Provisional Patent Application Ser. No. 62/430,873 are herein incorporated by reference.

The section headings used herein are for organizational purposes only and should not to be construed as limiting the subject matter described in the present application in any way.

INTRODUCTION

Many experts predict that there will be a market in excess of $5 billion dollars for commercial quantum information by 2020. Much like the fledgling optical communications industry in the early 90's that grew to a $100 billion by 2015, the emerging quantum information industry is expected to be a geopolitical and an economic game changer, disrupting entire industries, creating new industries, changing the way we live and work, and producing remarkable economic benefits.

It is well known that the quantum computer is the ultimate encryption "codebreaker." Less well known, and perhaps ultimately more useful for everyday use, are the quantum system features that ensure information privacy, provide correlated remote state transitions without speed of light delays, and provide improvements to sensing and imaging resolution. Some specific examples of the use of quantum information systems are to perform secure communication with quantum cryptography, new realms in weapons and defense systems with quantum processing, as well as new horizons in almost every aspect of life from medicine to renewable energy. These new quantum information systems will require devices that can manipulate quantum states in reproducible ways and be built using practical manufacturing processes.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 3 illustrates typical target optical, mechanical and operational specifications for a bench top QDC and QUC according to the present teaching.

DESCRIPTION OF VARIOUS EMBODIMENTS

Figure 1:
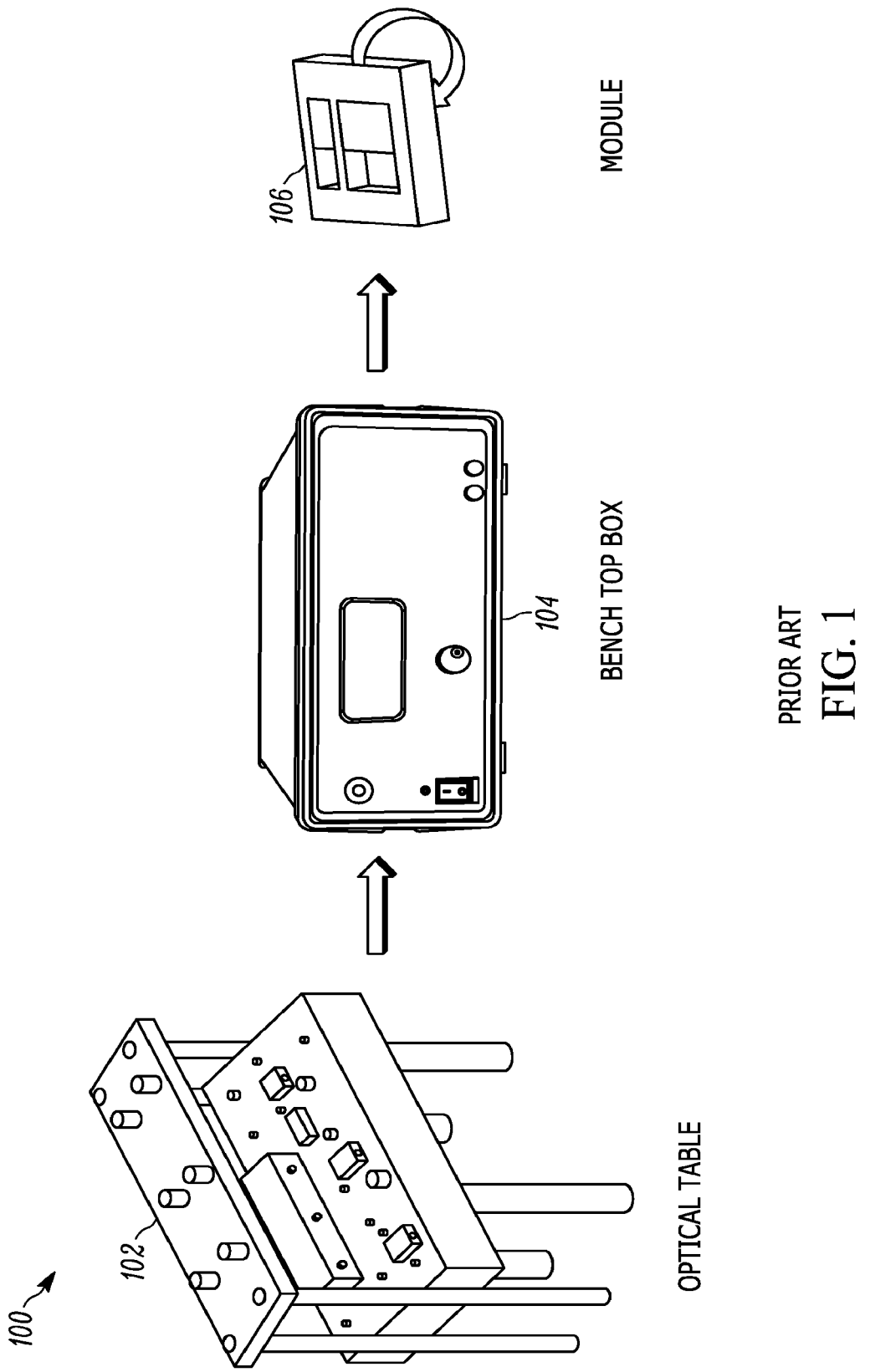
FIG. 1 illustrates the commercial evolution of fiber amplifier technology from experimental table top versions to commercially available bench top boxes to mass producible compact modules suitable for integration on linecards.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching can be performed in any order and/or simultaneously as long as the teaching remains operable. Furthermore, it should be understood that the apparatus and methods of the present teachings can include any number or all of the described embodiments as long as the teaching remains operable.

A quantum system requires that various quantum components, including atomic memories, photonic-chip-based interferometers, fiber transport systems, and detectors be connected together or interoperated. These individual components typically operate at different wavelengths. Also, the quantum state is sensitive to perturbation. Thus, a simple device that can convert wavelengths and, at the same time, preserve quantum state parameters to allow best-in-breed quantum components to easily connect, is needed to hasten the realization of the broad impact of quantum systems on society.

One aspect of the present teaching relates to high-performance Quantum Optical Wavelength Converters (QOWCs) that can be commoditized into a component for quantum optical systems. Quantum optical wavelength converters are often inserted between single-photon sources, quantum memories, logic gates, optical fiber transport and detector elements so these devices can function together as a system.

All-optical quantum wavelength conversion was first proposed by Kumar in 1990. In the many years since Kumar's work, experimental results have confirmed that entanglement, phase coherence, and photon statistics are preserved by wavelength conversion via sum frequency generation (SFG) and difference frequency generation (DFG) in $\lambda^{(2)}$ materials such as potassium titanyl phosphate (KTP) and lithium niobate (LN). Since then, a variety of wavelength converter architectures have been proposed and demonstrated. However, known wavelength conversion demonstrations typically require short pulse (high peak power) solid state laser pump sources and complicated bulk optic arrangements, which have configurations that occupy significant space on an optical bench and require frequent realignment. These wavelength conversion systems are not suitable for many practical systems.

While the use of nonlinear waveguides, such as periodically poled lithium niobate (PPLN) and periodically poled potassium titanyl phosphate (PPKTP) has reduced the pump power requirements for efficient wavelength conversion enough to allow the use of relatively convenient and inexpensive continuous wave (CW) pump sources, current quantum optical wavelength converters are still assembled by hand on optical tables using expensive mounting and coupling stages. Also, the assembly process is very time consuming and on-going maintenance is required to keep optical components in alignment. Each system is typically custom designed to convert the input wavelength of interest for that group of researchers to an acceptable output wavelength. Despite the importance of QOWCs to enhance quantum system research, there are currently no commercially available QOWC devices.

Most importantly, assembling wavelength converters by hand is a tedious and costly project that can be a significant distraction to the researcher which delays her project and the advancement of the art. One aspect of the present teaching is the realization that a "plug-and-play" quantum optical wavelength converter is needed in the art to advance the state-of-the-art in quantum information systems so that these systems can operate with high efficiency, and so that quantum characterization can be performed with high fidelity. Such "plug-and-play" quantum optical wavelength converters will accelerate the quantum information commercial market because they will allow large-scale, high-functioning, complex, multi-element system assembly to become routine in the industry.

In one embodiment, a quantum optical wavelength converter according to the present teaching includes a waveguide-based nonlinear element, a telecom-grade pump laser, and fiber-coupled filters. The wavelength specification is broad enough to cover a sizable number of experimental configurations, yet selective enough to provide a cost-effective solution. For applications such as of quantum information systems, quantum key distribution (QKD), and quantum networking that require transmission of quantum bits of information (qubits) over at least moderate distances, the quantum system must generate, process, and receive qubits with wavelengths in the low loss (<1 dB/km) wavelength region of optical fibers. This wavelength region is typically used by the telecommunications industry so it is sometimes referred to as the telecom band (spanning from approximately 1440 nm to 1740 nm). In some embodiments, qubits with wavelengths in the 1300 nm region of the spectrum may also be transmitted over optical fibers with low transmission losses. However, the best performing single photon receivers that can be commercialized in the near-term and operate at room temperature utilize silicon avalanche photodiodes (Si APDs) that detect photons with wavelengths shorter than 1000 nm, which is outside the telecom band. Other quantum devices, such as memories and sources, either operate more efficiently, or perhaps only, in the visible and near-infrared (NIR) region of the spectrum ($500 \text{ nm} < \lambda_{qubit} < 1000 \text{ nm}$).

Therefore, quantum systems that include multiple components will require quantum optical wavelength converters (QOWCs) to efficiently translate the wavelengths of qubits between the visible/NIR and telecom regions of the spectrum while preserving the coherent and quantum properties of the qubits.

One aspect of the present teaching relates to both a quantum downconverter (QDC) that will convert qubits in the visible/NIR region of the spectrum to qubits in the telecom region (infrared or IR) of the spectrum and a quantum upconverter (QUC) that will convert qubits in the telecom region of the spectrum to qubits in the visible/NIR region of the spectrum. We refer to these devices generally as quantum optical wavelength converters or QOWCs.

The footprint of a quantum optical wavelength converter is an important metric of its usefulness as a component in a practical system. One aspect of the present teaching is a combination of elements that results in a "bench top" optical wavelength converter. The commercialization footprints of QOWCs will likely follow a similar path to those of erbium-doped optical fibers, which also started as large and expensive set-ups on optical tables and progressed to bench top boxes and ultimately to line card mountable modules. FIG. 1 is an illustration of the commercial evolution 100 of fiber amplifier technology from experimental tabletop 102 embodiments to commercially available bench top boxes 104 to mass producible compact modules 106 suitable for integration on linecards.

Figure 2A:
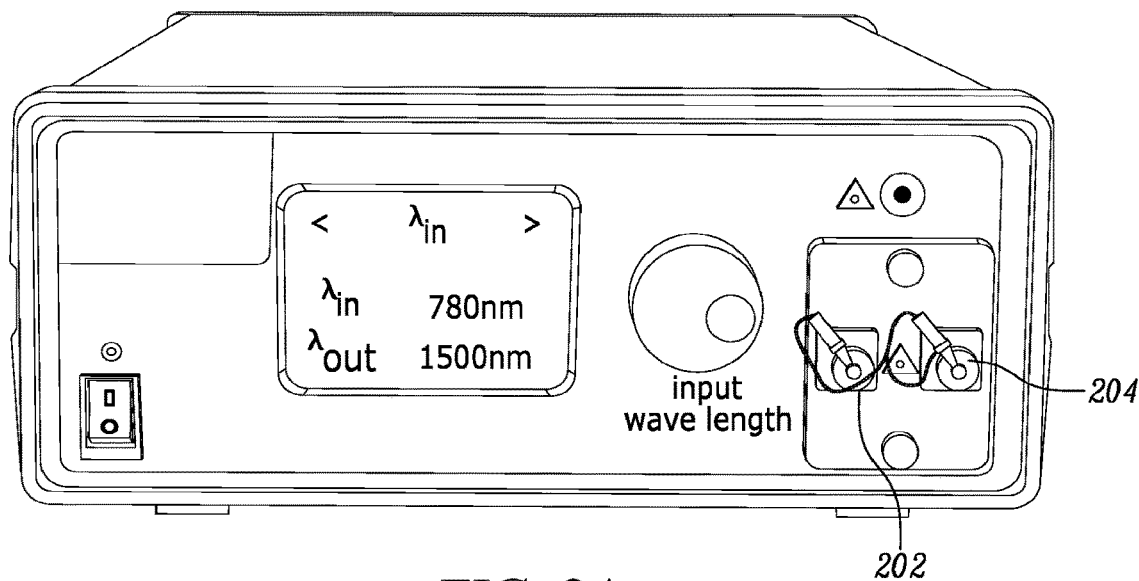
FIG. 2A illustrates a sample enclosure panel display for a quantum down converter (QDC) according to the present teaching.
Figure 2B:
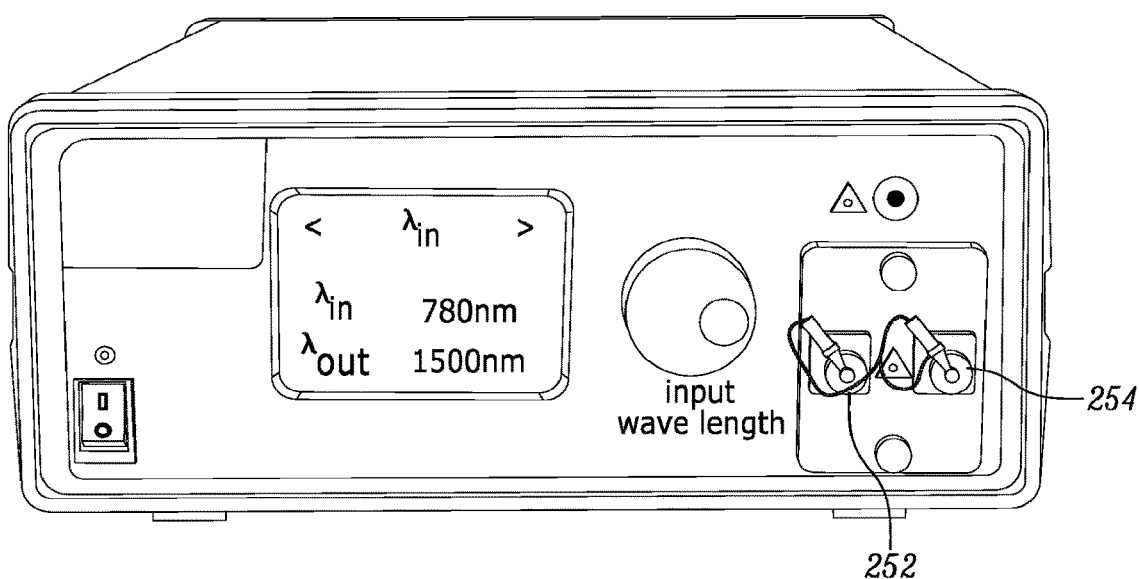
FIG. 2B illustrates a sample enclosure panel display for a quantum up converter (QUC) according to the present teaching.

FIG. 2A is an illustration of a sample enclosure panel display for a quantum down converter according to the present teaching. FIG. 2B is an illustration of a sample enclosure panel display for a quantum up converter according to the present teaching. In one embodiment, the down converter and upconverters of the present teaching are self-contained portable units 200, 250. FIGS. 2A and 2B illustrate an enclosure and front panel for the quantum optical wavelength downconverter (QDC) and upconverter (QUC), respectively. In one specific commercial embodiment, the QOWCs will be designed to have case dimensions less than 40 cm×30 cm×15 cm, to weigh less than 5 kg, and to operate over a range of case temperatures from +15° C. to +35° C. The portable units 200, 250 include an optical fiber input port 202, 252, and an optical fiber output port 204, 254. In some embodiments the fiber ports 202, 252, 204, 254 are polarization maintaining fiber input ports.

One feature of the quantum optical wavelength converters of the present teaching is that, in many embodiments, they are frequency tunable. FIG. 3 illustrates a table 300 that lists typical target optical, mechanical and operational specifications for a bench top QDC and QUC according to the present teaching. For example, the quantum optical wavelength downconverter can be specified for an input signal with a wavelength between 760 and 800 nm, and the input signal can be tuned by ±5 nm around the specified wavelength. Also, for example, the quantum optical wavelength upconverter can be specified for an input signal with a wavelength between 1445 and 1605 nm, and the input signal can be tuned by ±20 nm around that wavelength.

Figure 4A:
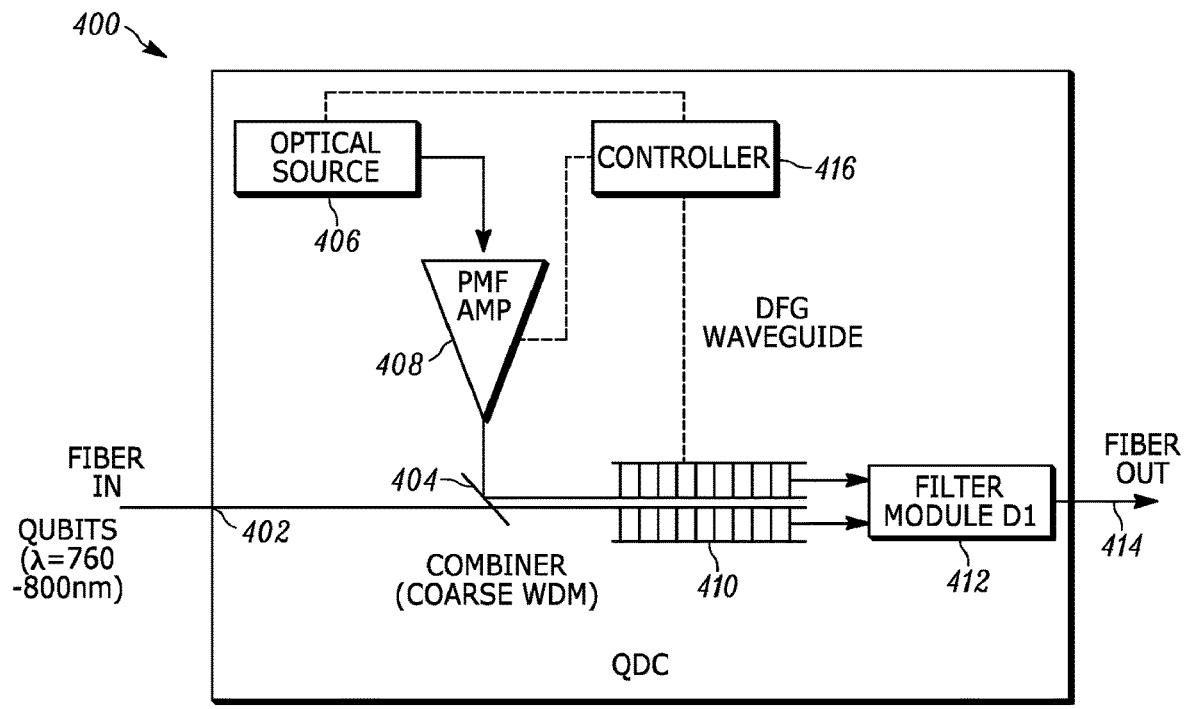
FIG. 4A illustrates a block diagram of a quantum down converter according to the present teaching.

FIG. 4A illustrates a block diagram of a quantum down converter 400 according to the present teaching. The quantum down converter 400 includes an input port 402 that receives an optical signal with one or more optical quantum states. The quantum states may be single photon states, polarization states, or some other form of optical quantum state. The quantum states may be encoded in one or more of time, frequency, polarization or other forms of encoding. The multiple quantum states in the optical signal may be sequential or may be in parallel. The input port 402 delivers the optical signal comprising optical quantum states to an optical combiner 404. In some embodiments, the optical combiner 404 is a coarse WDM combiner. In other embodiments, the optical combiner 404 is an optical beam splitter or other type optical signal combiner. The quantum down converter 400 includes an optical pump source 406. In some embodiments, the optical pump source 406 is an optical diode laser that operates at a wavelength on the ITU grid. In some embodiments, the light from the optical pump source 406 is amplified by an optional optical amplifier 408. The pump light is directed to a second input of the optical combiner 404 where the combiner 404 directs the light to a nonlinear optical waveguide 410. The nonlinear optical waveguide 410 converts the wavelength of the input optical signal that includes the one or more optical quantum states to a new wavelength, based on the wavelength of the pump source 406.

In some embodiments, the quantum down converter 400 uses an optical pump source 406 that is configured to have an engineered spectrum that results in a particular spectrum of converted optical quantum state. The output of the nonlinear optical waveguide 410 is filtered using an optical filter 412. The optical filter 412 suppresses the optical pump signal. In some embodiments, the optical filter 412 also filters the spectrum of the converted optical quantum state to produce a desired spectrum. The output of the optical filter 412 is coupled to an optical fiber 414 that provides an output for the quantum down converter 400. A controller 416 is used to control the pump source 406, optional amplifier 408, and nonlinear optical waveguide 410.

Figure 4B:
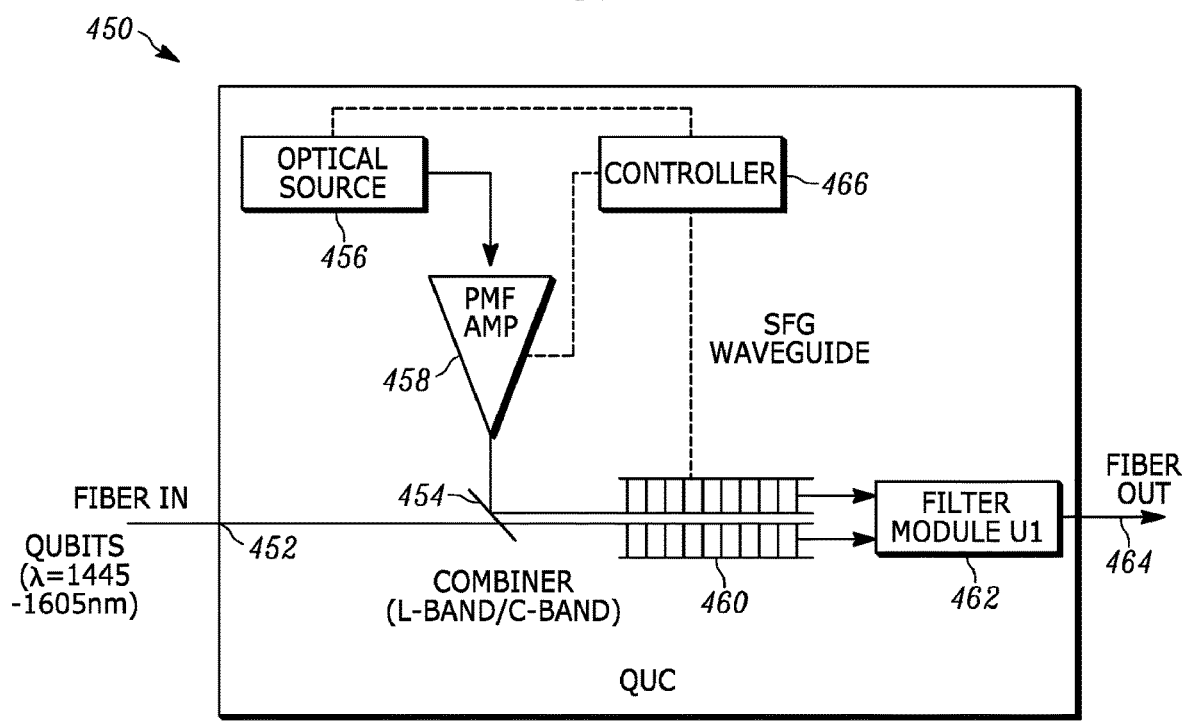
FIG. 4B illustrates a block diagram of a quantum up converter according to the present teaching.

FIG. 4B illustrates a block diagram of a quantum up converter 450 according to the present teaching. The quantum up converter 450 is similarly to the quantum down converter 400 that is described in connection with FIG. 4A. The quantum up converter 450 includes an optical input port 452, an optical combiner 454, an optical pump source 456, an optional optical amplifier 458, a nonlinear waveguide 460, an optical filter 462, an optical fiber output 464, and a controller 466 configured in a similar way to the quantum down converter 400 described in connection with FIG. 4A. However, these components are designed and configured for up conversion. For example, the nonlinear waveguide 460 will be chosen to achieve the specific up conversion frequency. In one embodiment, the combiner 454 is an L-Band/C-Band combiner.

Referring to both FIGS. 4A-B, both the quantum down converter 400 and the quantum up converter 450 devices can use an L-band laser diode as an optical pump source 406, 456 that operates at 1620.06 nm (channel Q50 on the ITU grid) to generate the appropriate pump signal. In various other embodiments, the quantum down converter 400 and the quantum up converter 450 devices can use an L-band laser diode as an optical pump source 406, 456 that operates at other channels in the L-band depending on the desired input signal wavelength range and on the target output wavelength range.

An exemplary input wavelength range is 760 nm-800 nm for the quantum down converter 400 and 1445 nm-1605 nm for the quantum up converter 450. Both devices can utilize an L-band laser diode as an optical pump source 406, 456 at 1620.06 nm (channel Q50 on the ITU grid) to generate the pump signal. The pump wavelength is the longest wavelength in the system, thus reducing the impact of scattering noise in the system. One advantage for choosing a standard ITU-grid telecom wavelength for the pump signal is that the number and variety of fiber optic filters available for filtering out the pump signal at the output of the QOWC device greatly increases.

In operation, the pump laser diodes acting as optical pump sources 406, 456 are amplified in amplifiers 408, 458. The amplifiers 408, 458 may be L-band amplifiers comprising polarization maintaining (PM) fibers. All of the fiber components that come before the nonlinear waveguide preferrably use PM fiber to ensure the correct polarization alignment between the pump and input signals for efficient wavelength conversion. While laser diodes and fiber amplifiers comprising PM fiber are not as common as standard single mode fiber, they are commercially available from multiple vendors. In operation, the output power from the fiber amplifier will be adjusted using a voltage-controlled variable optical attenuator (VOA) within the amplifier module. These adjustments can be manual or can be automated using specially designed control circuitry and software residing in the controller 406, 466 for this purpose.

In operation, the pump and input signals are combined in a fiber combiner 404, 454. For example, the fiber combiner 404 in the quantum down converter 400 can be a coarse WDM combiner because of the disparate wavelengths of the two input signals. The fiber combiner 454 in the quantum up converter 450 can be a C-band/L-band fiber combiner. For each of the quantum down converter 400 and the quantum up converter 450, the respective output from the fiber combiners 404,454 is coupled into their respective nonlinear waveguides 410, 460. The respective output from the nonlinear waveguides 410, 460 will be captured by a fiber and coupled to respective ones of a series of filters 412, 462 that will be used to reject the pump signal.

In various embodiments, the output wavelength of the QOWC is determined by the pump signal wavelength and by the input signal wavelength. The pump signal wavelength can be tunable over a desired wavelength range or can be a fixed wavelength. For QOWC embodiments with tunable pump signal wavelengths, the output wavelength from the device will tune as the input frequency of the optical pump wavelength is tuned. QOWC embodiments using tunable optical pump wavelengths are suitable for use in wavelength division multiplexed (WDM) quantum systems because the output wavelength from the QOWC should be a fixed value based on the input signal wavelength and based on the target output WDM signal. In these embodiments, the variable input wavelength can be accommodated by tuning the wavelength of the optical pump laser diode in order to achieve a particular converted output wavelength. The laser diode wavelength can be tuned by temperature tuning or by other means. Commercially available amplifiers are inherently broadband and are able to supply high output powers over a wide range of pump wavelengths. However, such a device will require optical pump suppression filters at the output of the device to tune with the pump wavelength. In some embodiments of the present teaching, commercially available tunable filters are cascaded to support this application.

Figure 5A:
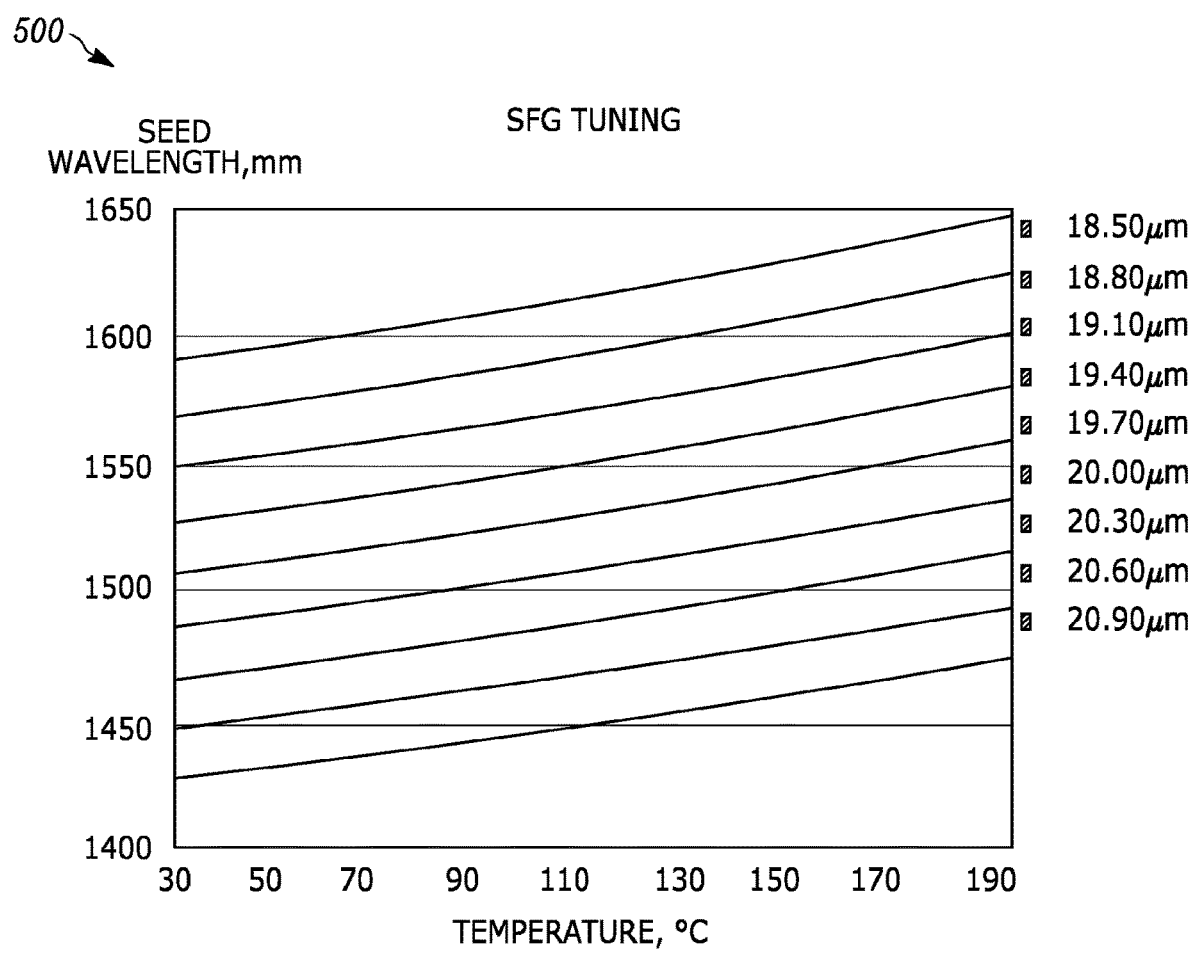
FIG. 5A illustrates the temperature Sum Frequency Generation (SFG) tuning curves for a PPLN waveguide device commercially available from Covesion Ltd. in the UK.
Figure 5B:
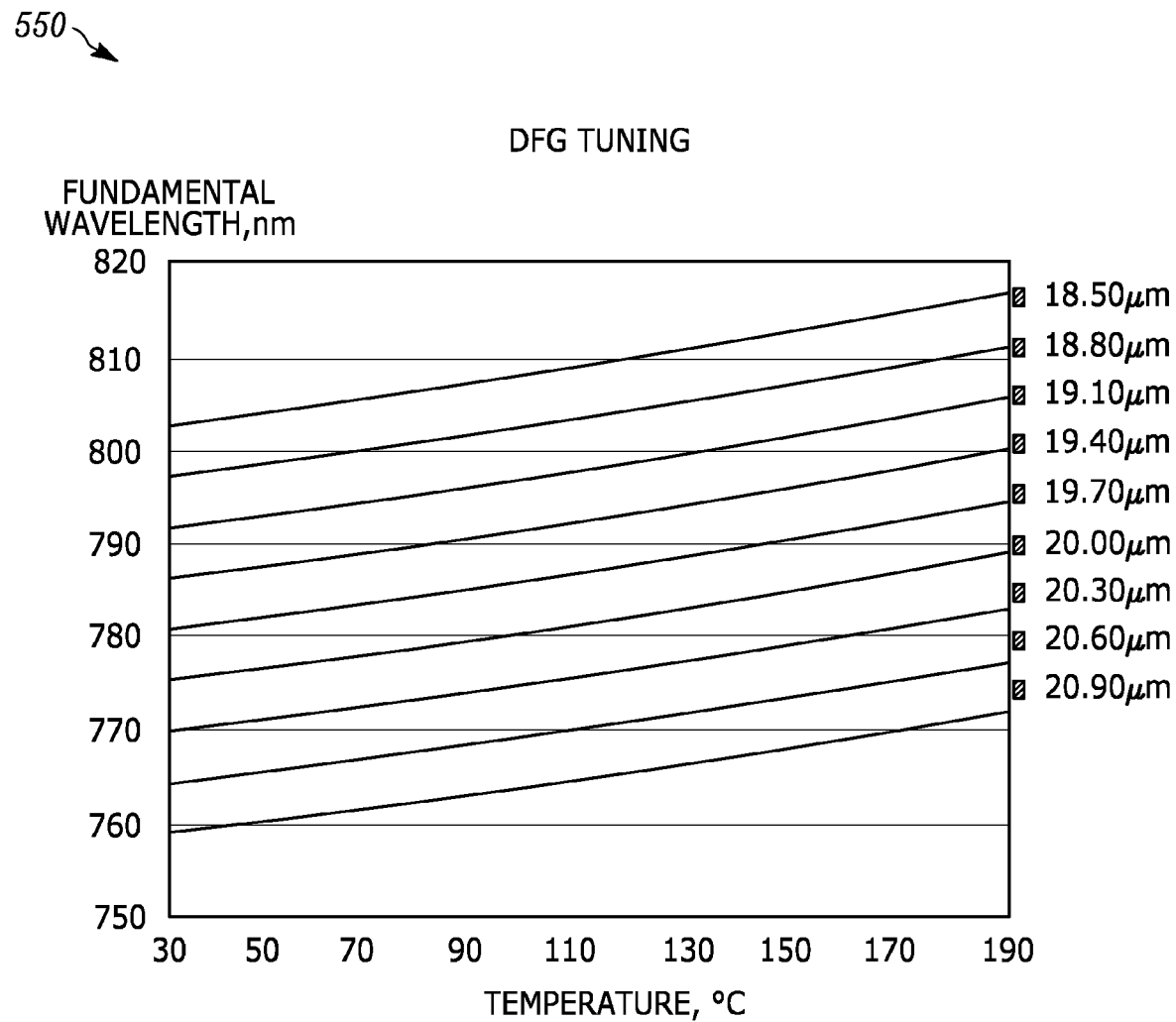
FIG. 5B illustrates the temperature Difference Frequency Generation (DFG) tuning curves for a PPLN waveguide device commercially available from Covesion Ltd. in the UK.

FIG. 5A illustrates the temperature Sum Frequency Generation (SFG) tuning curves 500 for a PPLN waveguide device commercially available from Covesion Ltd. in the UK. FIG. 5B illustrates the temperature Difference Frequency Generation (DFG) tuning curves 550 for a PPLN waveguide device commercially available from Covesion Ltd. in the UK. The table 300 in FIG. 3 shows that the input signal center wavelengths to the QDC will be specified in 5 nm increments and the signal center wavelengths to the QUC will be specific in 20 nm increments. Referring for FIGS. 4A-B. the nonlinear waveguides 410, 460 include multiple waveguides with different poling periods that support the different input wavelengths. The nonlinear waveguides 410, 460 are fabricated on a nonlinear crystal that is temperature tuned to change its optical properties in order to change its frequency conversion characteristics. In some embodiments, electrical tuning, using, for example piezoelectric devices or electro-optic devices, are used to provide the tuning of the optical properties nonlinear waveguides 410, 460 that change the frequency conversion characteristics.

High coupling efficiency in and out of the waveguide-based nonlinear waveguides 410, 460 can be achieved with PPLN waveguide device. High suppression of the pump signal at the device output can also be achieved. Single mode fibers may be coupled to the nonlinear waveguides with coupling efficiencies that are over 75% per facet. These efficiencies can be maintained as the waveguides are temperature tuned over 100° C. to support a desired input signal wavelength tunability.

The index of refraction and waveguide dimensions of commercially available nonlinear waveguides such as PPLN and PPKTP are not well matched to the index of refraction and the waveguide dimensions of standard optical fibers. This mismatch results in coupling losses into and out of the waveguide itself. The mismatch in dimensions results in a modal mismatch. Another issue specific to the downconverter geometry is that two disparate wavelengths, one in the visible/NIR and one in the IR must both be maintained as single mode signals when being coupled into the nonlinear waveguide. Waveguide can be specifically designed to improve the mode matching between the nonlinear waveguides 410, 460 and the fiber and also to maintain a single mode. For example, waveguides can be specifically designed with tapers at the ends of the fiber and/or the nonlinear waveguide. Lensing elements can also be either formed on or attached to the end of the fiber itself.

Coupling losses between tapered fibers, lensed fibers, and fiber and lens combinations have been modeled with standard waveguide geometries to determine which coupling scenarios yield the highest predicted coupling efficiency. It has been determined that additional gains in efficiency can be achieved using waveguide tapers and/or modal filters.

Attaching the fibers to the waveguides so that the coupling efficiency is fixed can be accomplished by using various types of epoxy to provide the fixed coupling or by using specially designed mechanical mounts with one or more materials with desirable coefficients of thermal expansion. These specially designed mechanical mounts are advantageous in some embodiments because the temperature cycling of the nonlinear waveguide may stress the epoxied joint. In various embodiments, the specially designed mechanical mounts are constructed using 3D printing with one or multiple materials. Such specially designed mechanical mounts can be used to hold the fibers and the nonlinear waveguides in alignment over a wide range of nonlinear waveguide temperatures. Using the method and apparatus of the present teaching, an input and output coupling efficiency of greater than 75% per facet can be achieved that can be maintained over the 100° C. temperature tuning range of the nonlinear crystal.

The advantage of using a waveguide nonlinear element to perform the wavelength conversion is that the longer interaction length means lower pump power levels can be used to achieve extremely high (~100%) internal wavelength conversion efficiencies. Lower required pump power levels are beneficial because they can be achieved using CW sources, which allows the device to operate asynchronously, that is, without any required timing coordination between it and the other devices in the quantum system. Thus, another feature of the quantum optical wavelength converters of the present teaching is that, in many embodiments, they operate asynchronously. The QDC and QUC may use continuous wave (CW) pumps to perform the wavelength conversion, so qubits can arrive periodically or randomly, and at any rate. There will be no need to synchronize the QOWCs with other quantum devices in the system.

In order to ensure that the output signal from the QDC and the QUC is the desired converted qubit and not photons from the pump signal, the pump signal must be filtered out after the nonlinear waveguide element. Reducing the pump power requirement in the conversion process is advantageous because it will reduce the amount of filtering that is required to reduce the pump power at the output from the device to the desired "residual pump" level. Furthermore, less filtering will typically translate into lower loss in the optical path, and therefore a higher end-to-end efficiency for the overall device. Depending on the specified level of acceptable residual pump power, more than 100 dB of pump suppression may need to be achieved by the filter architecture. However, in some embodiments, much less pump suppression can be tolerated. Generally pump suppression in the 10-100 dB range is used, with pump suppression greater than 90 dB being common.

There is a wide variety of fiber filtering devices developed for the telecom industry. However, the specifications for QOWC applications greatly exceed any usual commercial telecom requirement. One aspect of the quantum optical wavelength converters of the present teaching is meeting these more challenging specifications by using cascading multiple fiber filters. Numerous commercially available fiber filter elements can be used including wavelength couplers, multiplexers, demultiplexers, fiber Bragg gratings (FBG), and fiber coupled interference filters. Also, one aspect of the present teaching is meeting these more challenging specifications by using nonlinear waveguide elements that output the pump and converted signals in orthogonal polarizations.

Another feature of the quantum optical wavelength converters of the present teaching is that in many embodiments they provide high efficiency conversion. The efficiency for the QOWCs can be greater than 30% for applications that do not require high pump suppression and greater than 20% for applications that do require high pump suppression. These efficiencies are fiber in to fiber out efficiencies. These efficiencies compare very favorably with state-of the art research results using solid state pulsed lasers and high power pump resonating techniques.

Another feature of the quantum optical wavelength converters of the present teaching is that, in many embodiments, they will be configured to operate on a lab bench or a shelf. The QOWCs will be designed using all fiber-coupled devices so there will be no need for a user to align any components or isolate the device from minor vibrations. Input and output signals to the QOWCs can be provided using standard fiber FC or SC ports.

Another feature of the quantum optical wavelength converters of the present teaching is that, in many embodiments, they are configurable to enable a user to choose the operating specifications that meet their particular needs. The QOWCs can be designed using modular output filter stages that are selected during the assembly process to provide customized performance specifications and price points.

Another feature of the quantum optical wavelength converters of the present teaching is that, in many embodiments, they are capable of performing spectral shaping. Spectral shape and/or bandwidth is another parameter that may be divergent across multiple quantum devices. The spectral bandwidth of typical qubits suitable for quantum information systems may vary over many orders of magnitude, depending on the particular type of quantum element that generates or processes the qubit. For example, a variance from 50 THz for quantum-optical coherence tomography to 50 Hz for certain quantum memories has been reported in the literature. Another aspect of the quantum optical wavelength converters of the present teaching is the realization that there is a need for an all-optical spectrum converter that can efficiently tailor the spectrum of qubits from broadband to narrowband and vice versa.

Thus, the methods and apparatus of the present teaching can include spectral manipulation of single photon sources. In one embodiment of the present teaching, spectral manipulation of single photon sources is implemented in waveguides. As described herein, one feature of using optical waveguides is that the required pump power is often much lower compared to the pump power required to generate the necessary non-linarities in a bulk crystal. As described herein the lower optical pump power levels allows the use of commercially available CW sources or pulse sources with relatively low average power outputs. Also, optical waveguides are more efficient than bulk crystals. Thus, using optical waveguides is highly desirable because they are capable of achieving high nonlinear conversion efficiencies with relatively low optical pump power. Using relatively low optical pump power is advantageous because low optical pump powers increases wall plug efficiency and reduces the size, weight, and necessary power output of the pump source.

Another aspect of the quantum optical wavelength converters of the present teaching is using an optical pulse width that is in a desirable operating range considering the dispersion and non-linear characteristics of the waveguide. A short pulse can be used with a waveguide as along as the dispersion characteristics do not spread the pulse so that the peak power of the pulse is below the required peak power to generate the required non-linearity.

Thus, one aspect of the quantum optical wavelength converters of the present teaching is that short optical pump pulses can be used to efficiently perform wavelength conversion schemes in optical waveguides. By "short optical pump pulses" we mean generally the less than 10 nanoseconds. The nonlinear conversion efficiency is maintained over a narrower bandwidth even as the crystal gets longer.

Another aspect of the quantum optical wavelength converters of the present teaching is to utilize the nonlinearity of the waveguide to assist in the spectral conversion process. Known systems do not use non-linear waveguides to generate spectral conversion. Instead, spectral conversion in the art has been performed primarily by filtering and other passive techniques. For example, artificially created linearly chirped pump-pulses can been used to narrow the linear-chirped single photon spectra where the chirps on the two pulses are approximately equal and opposite (one was red to blue, and the other blue to red) in a bulk nonlinear crystal. When those pulses overlapped in time, the red and blue wavelengths at the front of the two pulses convert to the same wavelength as the blue and red wavelengths at the back of the two pulses, and thus a broadband chirped single photon pulse is converted to a narrow band signal.

The broadband signal from, for example, a known quantum dot-type single photon source, qubit generator, or quantum logic element typically exhibit spectra that have linewidths ranging from a few hundred MHz to 10's of GHz, and frequently a few GHz. The narrow band signal from a known atomic memory or other atom-like quantum element is commonly in a range of a few kHz to a few MHz, and frequently in the 100 kHz range. Thus, one embodiment of the wavelength converter of the present teaching would convert a broad bandwidth pulse that has a nominally GHz range (1-1000 GHz) linewidth, to a narrow band pulse that has a nominally kHz range (1-1000 kHz) linewidth, and vice versa. In various embodiments, the wavelength converters of the present teaching would convert bandwidths from narrowband linewidths to broadband linewidths that span anywhere from three to six decades of bandwidth. As described herein, some embodiments of the present teaching convert extremely wide differences in linewidth, for example from the order of 10 Hz linewidth to the order of 10 THz linewidth.

Another aspect of the quantum optical wavelength converters of present teaching is the use of linear chirped spectra to pass a broadband signal through an optical fiber or grating pair with a desired chirp magnitude and sign to realize a desired spectral conversion in bandwidth and/or phase. In practical systems, the spectrum of a single photon source is irregular i.e. not linearly chirped. It is necessary to program the pump spectra to convert these irregular single photon spectra to desired spectra. In these situations, it is necessary to carefully control not only the amplitude and bandwidth of the frequency spectrum of the converted signal, but also the phase.

One method to realize a phase and frequency transformation of the signal is to mix the incoming spectrum with a signal from a modified optical pump source 406, 456 whose frequency response is carefully designed with a particular amplitude and phase as a function of frequency. The modified optical pump source 406, 456 can be tunable, even continuously tunable. Also, the modified optical pump source can be programmable to generate arbitrary-shaped pulses and/or a particular phase and amplitude as a function of frequency. For example, a Finisar WaveShaper® system can be used to generate a pump signal with an appropriate frequency response to provide the desired spectral conversion of the single photon source after passing through the wavelength and spectral conversion device of the present teaching. In some embodiments, the optical pump source 406, 456 includes a dispersive element to spread the spectral components of the pump laser in space, a controllable spatial light modulator such as a liquid crystal on silicon (LCOS) spatial light modulator (SLM) to modulate the amplitude and/or phase of the spatially distributed spectral components, and some coupling optics. These elements are used to produce "any" pump phase and amplitude as a function of frequency spectra. In this way, the resulting conversion process is highly flexible and customizable. For example, if there are bandwidth restrictions on the pump spectra because a waveguide is used to generate the nonlinearity, the LCOS SLM phase patterns are chosen to be optimized for the particular application. For example, the phase patterns may be chosen to minimize dispersive pulse spread that reduces nonlinearity generated in the waveguide. Also, the phase patterns can be chosen to minimize cross talk between single photon pulses. In other embodiments, numerous other devices can be used to modulate the amplitude and phase of the pump signal.

Another aspect of the quantum optical wavelength converters of the present teaching is methods and apparatus for quantum optical waveguide conversion with the ability to provide "higher order" corrections. For example, compression techniques that use amplitude and phase to modify the pulse width of a single photon pulse exiting the wavelength converter can be used to compensate for higher-order aberrations affecting the pulse shape in the time domain. Also, for example, lower order dispersion effects are compensated using post-converter stages that utilize gratings. Higher order dispersion effects are compensated using post-converter stages with deformable mirrors. These embodiments of the present teaching using post-converter compensation stages represent the first "high-order" pulse manipulation schemes that manage the pulse width and spectral content of single photon sources.

Another aspect of the quantum optical wavelength converters of the present teaching is that traditional passive wavelength filters can be used to eliminate uncompensated or undesired portions of the spectra. For example, high-pass and/or low-pass filters can be utilized to filter away signal energy at the edges of the spectra. Also, band-pass and/or notch filters may be utilized to filter out or reduce the power in certain regions of the single photon spectra. For example, a Finisar WaveShaper® can be used to realize these, and other filter functions.

Another aspect of the quantum optical wavelength converters of the present teaching is that two-dimensional phase modulating SLMs can be used to modulate the phase and amplitude of a wavelength and spatially dispersed optical signal and this effect can be used to modulate a single photon pulse, or a one- or two-dimensional spatial array of single photon pulses. In addition, a two-dimensional spatial array of phase modulating elements may be configured so that a single photon signal interacts with different portions of the array sequentially. For example, a phase SLM may be configured to operate as a long-pass filter across one column of elements and as a short pass filter across another column of elements. If a single photon source impinges on the "long-pass filter" column on one pass through the device or on one bounce from the SLM, and then impinges on the "short-pass filter" column on a second pass or bounce, then a single SLM may be used to realize cascaded filtering of the single photon spectra. It should be understood that the methods and apparatus of the present teaching can use numerous other filter functions and numbers of bounces from the SLM to achieve quantum optical wavelength conversion.

In one specific embodiment of the method and apparatus for quantum optical waveguide conversion according to the present teaching, the quantum signal with the first spectrum mixes with a pump with a second fixed or variable spectrum in a nonlinear device, such as a nonlinear crystal or waveguide, to produce a quantum signal at a different center frequency and with a third spectrum. In practice it is sometimes desirable to use optical pumps with programmable spectrum.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. An optical quantum state converter comprising:
   a) an optical fiber input port configured to receive an optical signal comprising an optical quantum state at a first wavelength from an optical source;
   b) an optical combiner having a first input coupled to the optical fiber input port;
   c) a tunable optical pump source having an output that is coupled to a second input of the optical combiner, the tunable optical pump source providing a tunable optical pump signal comprising at least two pump signal wavelengths to the second input of the optical combiner;
   d) a tunable nonlinear optical waveguide having an input that is coupled to an output of the optical combiner, the tunable nonlinear optical waveguide converting the optical quantum state at the first wavelength to an optical quantum state at a tunable second wavelength determined by the tunable optical pump signal, the tunable optical waveguide configured with a first poling period supporting one of the at least two pump signal wavelengths and a second poling period supporting the other of the at least two pump signal wavelengths;
   e) a tunable filter optically coupled to an output of the tunable nonlinear optical waveguide, the tunable filter configured to suppress the tunable optical pump signal to a desired residual pump level for each of the at least two wavelengths and to preserve a quantum property of the converted optical quantum state at the tunable second wavelength; and
   f) a controller connected to the tunable nonlinear optical waveguide, the controller configured to tune the tunable nonlinear optical waveguide based on a length of the tunable second wavelength of the optical signal comprising the optical quantum state to provide phase matching at the second wavelength and both of the at least two pump signal wavelengths in the tunable nonlinear optical waveguide.

2. The optical quantum state converter of claim 1 wherein the optical source comprises a single-photon optical source.

3. The optical quantum state converter of claim 1 wherein the optical source comprises a quantum memory.

4. The optical quantum state converter of claim 1 wherein the optical source comprises an optical fiber transport system.

5. The optical quantum state converter of claim 1 wherein the first wavelength and the tunable second wavelength are a different wavelength.

6. The optical quantum state converter of claim 1 wherein the at least two pump signal wavelengths operate at the same time.

7. The optical quantum state converter of claim 1 wherein the at least two pump signal wavelengths operate at different times.

8. The optical quantum state converter of claim 1 wherein the desired residual pump level is less than −80 dBm.

9. The optical quantum state converter of claim 1 wherein the desired residual pump level is less than 100 dB less than the input pump level.

10. The optical quantum state converter of claim 1 wherein the tunable filter comprises a cascaded tunable filter.

11. The optical quantum state converter of claim 1 wherein the tunable nonlinear optical waveguide is further configured to support a single optical mode for the optical signal comprising the optical quantum state at the first wavelength and to support a single optical mode for the tunable optical pump signal at the at least two pump signal wavelengths.

* * * * *